Patented Apr. 29, 1941

2,239,742

UNITED STATES PATENT OFFICE 2,239,742

PREPARATION OF PREGNENDIONES FROM PREGNENOLONES

Arthur Serini, Berlin, Lothar Strassberger, Berlin-Wilmersdorf, and Adolf Butenandt, Berlin-Dahlem, Germany, assignors to Schering Corporation, Bloomfield, N. J., a corporation of New Jersey No Drawing. Application April 10, 1939, Serial No. 267,183. In Germany September 15, 1934

8 Claims. (Cl. 260—397)

The present invention relates to the production of pregnendiones of the general formula $C_{21}H_{30}O_2$, and more particularly to the manufacture of pregnendiones, by the oxidation of pregnenolones.

This application is a continuation-in-part of our copending application Serial No. 39,804, filed September 9, 1935.

In the oxidation of pregnenol-3-ones-20 to pregnendiones, it is desirable to protect the double bond temporarily against the oxidizing agent so as to increase the yield of the desired compound, the double bond being restored after the oxidation by the removal of the protecting agent.

We have found that this protection of the double bond of pregnenol-3-ones-20 can be conveniently and efficiently accomplished by intermediate addition of hydrogen halide, for example, hydrogen chloride and hydrogen bromide. In such addition the elements of the hydrohalic acid become attached to the nuclear carbons joined by a double bond and temporarily saturate such bond. After the completion of the oxidation, the added hydrogen and halogen can be split off from the monohalogen diketones with the aid of alkaline-reacting agents, for example, potassium acetate, pyridine, and the like, with the production of the unsaturated diketone.

The addition of the hydrogen halide to the carbon-to-carbon double bond of the pregnenol-3-ones-20 and the splitting off thereof can, we have found, be carried out by a procedure which itself is known; see, for example, Houben-Weyl, Methoden der org. Chemie, 2nd vol., 2nd edition (1922), pp. 768 et seq. and pp. 744 et seq.

Among the oxidizing agents that may be employed may be mentioned by way of example compounds of hexavalent chromium, such as chromic acid anhydride and the like, permanganate compounds of the alkali and alkaline earth metals, also hydrogen peroxide and other known oxidizing agents capable of converting a secondary alcohol group into a keto group.

The pregnenol-3-ones employed in accordance with our invention may be of various origins, either natural or synthetic. Thus they may be prepared by the oxidation of bisnorcholenic acids as described in the copending application of Adolf Butenandt Serial No. 34,599; or they may be prepared from pregnandiols and pregnandiones. The reaction conditions to be maintained during the oxidation of the temporarily saturated pregnenolones are described in Houben-Weyl, Methoden der org. Chemie, vol. 2, 2nd edition, 1922 (page 41 et seq.).

The reactions involved in our process may be represented graphically by the following structural formulas, wherein X, Y represent added halogen-hydrogen:

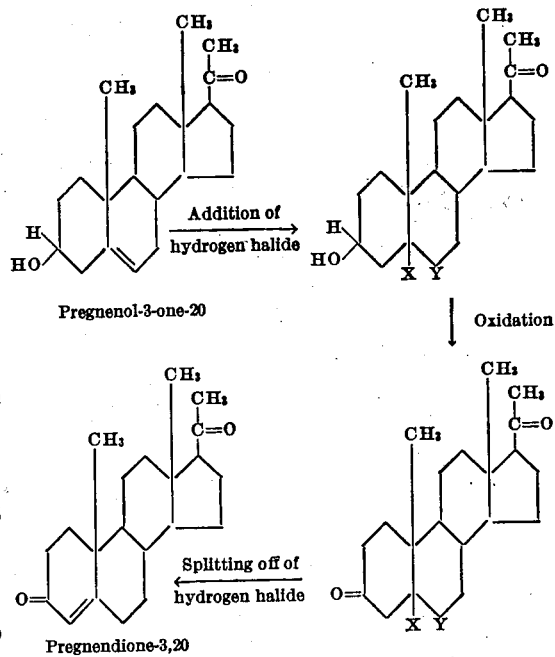

Pregnenol-3-one-20

Pregnendione-3,20

Detailed procedures for carrying out the invention are given by way of example hereinbelow, but it will be understood that these are presented merely by way of illustration and not as indicating the scope of the invention.

Example 1

2 gms. of pregnenol-3-one-20 of melting point 190° C. are dissolved in 50 ccs. of an ether-alcohol mixture. Into this solution, 20 gms. of dry hydrobromic acid gas are introduced while cooling. After 24 hours, the solution is concentrated by partially evaporating the solvent, and the precipitated hydrobromide is filtered off by suction and dissolved in 100 ccs. of glacial acetic acid. To this solution, while cooling, a solution of 0.3 gm. of chromic acid anhydride in glacial acetic acid is added. After allowing the reaction mixture to stand for 2 days, it is heated with 5 gms. of potassium acetate for 4 hours to boiling, poured in water and extracted with ether. On evaporating the ether and further purification, pregnendione is obtained.

Example 2

2 gms. of pregnenol-3-one-20 are dissolved in 50 ccs. of mixture of equal parts of ether and absolute alcohol. Into this solution 20 gms. of dry hydrochloric acid gas are introduced and the reaction mixture is allowed to stand for 24 hours in the cold. Thereupon the pregnenolone hydrochloride precipitated is filtered off by suction, dissolved in glacial acetic acid and oxidized with 0.3 gm. of chromic acid anhydride in glacial acetic acid. After oxidation most of the glacial acetic acid is evaporated in a high vacuum whereby the temperature is kept as low as possible. The residue is mixed with 100 ccs. of alcohol and 6 gms. of potassium acetate and heated for 8 hours to boiling. The reaction mixture is then poured into water and extracted with ether. On evaporation of the ether the unsaturated diketone pregnendione is obtained.

Example 3

20 gms. of dry gaseous hydrochloric acid are passed into a solution of 2 gms. of pregnenol-(3)-one-(20) of the melting point 190° C. in 50 ccs. of a mixture of equal parts of ether and absolute alcohol. After allowing the mixture to stand for 24 hours, the pregnenolone hydrochloride precipitated is filtered off by suction and is dissolved in 50 ccs. of benzene. The benzene solution is shaken with 45 ccs. of 4% potassium permanganate solution after adding 20 ccs. of 10% sulfuric acid, for 6 hours at room temperature. Thereupon the manganese dioxide formed is brought into solution by means of sulfur dioxide, the benzene layer is separated from the aqueous layer and evaporated to dryness in a vacuum. The residue is heated for 8 hours to boiling with 6 gms. of potassium acetate and 100 ccs. of absolute alcohol. The mixture is then poured into water and extracted with ether. The pregnendione obtained is purified by recrystallization from alcohol and shows then a melting point of 128° C.

Example 4

2 gms. of pregnenol-3-one-20 of melting point 190° C. are treated with 10 ccs. of absolute ether and 20 ccs. of methyl alcoholic hydrochloric acid containing 15 gms. of hydrochloric acid. The mixture is allowed to stand for 48 hours and the ether is removed by evaporation in vacuo at room temperature. The reaction product is precipitated with water and is dried over calcium chloride.

2 gms. of the obtained product are dissolved in 200 ccs. of glacial acetic acid and then treated with 0.6 gm. of chromium trioxide in 15 ccs. of glacial acetic acid. The reaction mixture is allowed to stand for 2 days and is then precipitated with water, and the precipitate dried in vacuo over calcium chloride. The obtained pregnendione hydrochloride is dissolved in 60 ccs. of absolute pyridine and heated for 5 hours to 120–130° C. The reaction mixture is then poured into water and extracted with ether. The ethereal layer is washed with dilute acid, water, and alkali, and finally again with water. The ethereal solution is again dried and evaporated. From the residue, the pregnendione is recovered in the usual manner.

The separation and isolation of the halogen-containing intermediate products and of the unsaturated end products can be accomplished not only in the manner described in the above examples, but also according to other methods of separation; thus the reaction mixture can be extracted with suitable solvents and the latter evaporated, or the formed compounds can be precipitated from their solutions with the aid of water or of organic solvents in which they are insoluble. They may also be converted into insoluble or difficultly soluble condensation products, as with typical ketone reagents, such as semi-carbazide, thio-semi-carbazide, phenylhydrazine, hydroxylamine, and the like.

The purification of the intermediate and end products can be effected also by fractional or repeated crystallization, distillation, or sublimation.

The pregnendiones 3,20 of the formula $C_{21}H_{30}O_2$ obtainable according to the present process represent valuable physiological substances; by the use of pregnenol-3-one-20 of melting point 190° C. as starting material, there is obtained, for example, a crude product from which by further purification a crystallisate can be recovered which appears to be identical with the crystallisate of the composition $C_{21}H_{30}O_2$ which can be isolated from corpora-lutea. This synthetic product shows also the same behavior as the natural product in that it appears in two different forms, one of melting point 121° C. and another of melting point 128.5° C.; further, it has the same physiological efficiency as the natural product obtained from corpora-lutea. With regard to the method of testing of physiological efficiency, reference is had to Butenandt, Westphal and Hohlweg, Zeitschrift f. physiol. Chemie, vol. 227, page 84 (1934).

Variations from the specific procedures, proportions, and specific conditions of reaction may be resorted to within the scope of the appended claims without departing from the spirit of the invention.

We claim:

1. Process for the manufacture of pregnendiones of the formula $C_{21}H_{30}O_2$, comprising converting pregnenol-3-one-20 of the formula $C_{21}H_{32}O_2$ into monohalogenated pregnanolone by treatment with a hydrogen halide to add the elements of such acid at the double bond, reacting the monohalogenated pregnanolone with an agent capable of oxidizing an alcohol group to a keto group, and then treating the reaction product with an agent capable of splitting off the hydrogen halide to restore the double bond.

2. Process according to claim 1, wherein a hexavalent chromium compound is employed as the oxidizing agent.

3. Process according to claim 1, wherein chromium trioxide is employed as the oxidizing agent.

4. Process according to claim 1, wherein the hydrogen halide is split off by treatment with an organic base.

5. Process according to claim 1, wherein the hydrogen halide is split off by treating the reaction product with a pyridine base.

6. Process according to claim 1, wherein the addition of hydrogen halide is effected by passing dry hydrogen halide gas into a solution of the pregnenolone.

7. Process according to claim 1, wherein the hydrogen halide is hydrobromic acid.

8. Process according to claim 1, wherein the hydrogen halide is hydrochloric acid.

ARTHUR SERINI.
LOTHAR STRASSBERGER.
ADOLF BUTENANDT.